(12) United States Patent
Faruque et al.

(10) Patent No.: US 11,794,594 B2
(45) Date of Patent: Oct. 24, 2023

(54) ELECTRIC-VEHICLE BATTERY RESTRAINT

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 17/320,318

(22) Filed: May 14, 2021

(65) Prior Publication Data

US 2022/0363143 A1    Nov. 17, 2022

(51) Int. Cl.
*B60L 50/64* (2019.01)
*B60K 1/04* (2019.01)

(52) U.S. Cl.
CPC .............. *B60L 50/64* (2019.02); *B60K 1/04* (2013.01); *B60K 2001/0438* (2013.01)

(58) Field of Classification Search
CPC ... B60L 50/64; B60K 1/04; B60K 2001/0438; B60Y 2306/01
See application file for complete search history.

(56) References Cited

U.S. PATENT DOCUMENTS

| 9,139,074 B2 * | 9/2015 | Jarocki ................... B60K 1/04 |
| 2013/0022851 A1 | 1/2013 | De Oliveira |
| 2018/0354438 A1 | 12/2018 | Baccouche et al. |
| 2022/0194198 A1 * | 6/2022 | Blomstrand ......... B62D 21/152 |

FOREIGN PATENT DOCUMENTS

| CN | 111725456 A | 9/2020 |
| DE | 102010050826 A1 | 5/2012 |
| DE | 102019206934 A1 | 11/2020 |

\* cited by examiner

*Primary Examiner* — Paul N Dickson
*Assistant Examiner* — Shams Dhanani
(74) *Attorney, Agent, or Firm* — Frank A. MacKenzie; Bejin Bieneman PLC

(57) ABSTRACT

An electric vehicle includes a first rocker and a second rocker spaced from each other. A first slider is slideably engaged with the first rocker, and a second slider is slideably engaged with the second rocker. A first pyrotechnic actuator is supported by the first rocker and is configured to slide the first slider relative to the first rocker. A second pyrotechnic actuator is supported by the second rocker and is configured to slide the second slider relative to the second rocker. A cable extends from the first slider to the second slider.

20 Claims, 8 Drawing Sheets

ELECTRIC-VEHICLE BATTERY RESTRAINT

BACKGROUND

An electric vehicle includes a battery that powers the vehicle, including propulsion of the vehicle. For example, wheels of the vehicle are powered by one or more electric motors that are powered by the battery. The battery is relatively large and heavy and, accordingly, the battery is typically packaged below the passenger compartment of the vehicle. The battery may be subject to being shorted during certain vehicle impacts if loads are applied to the battery and/or if the cooling system used to cool the battery leaks coolant on the battery.

DETAILED DESCRIPTION

Figure 1:
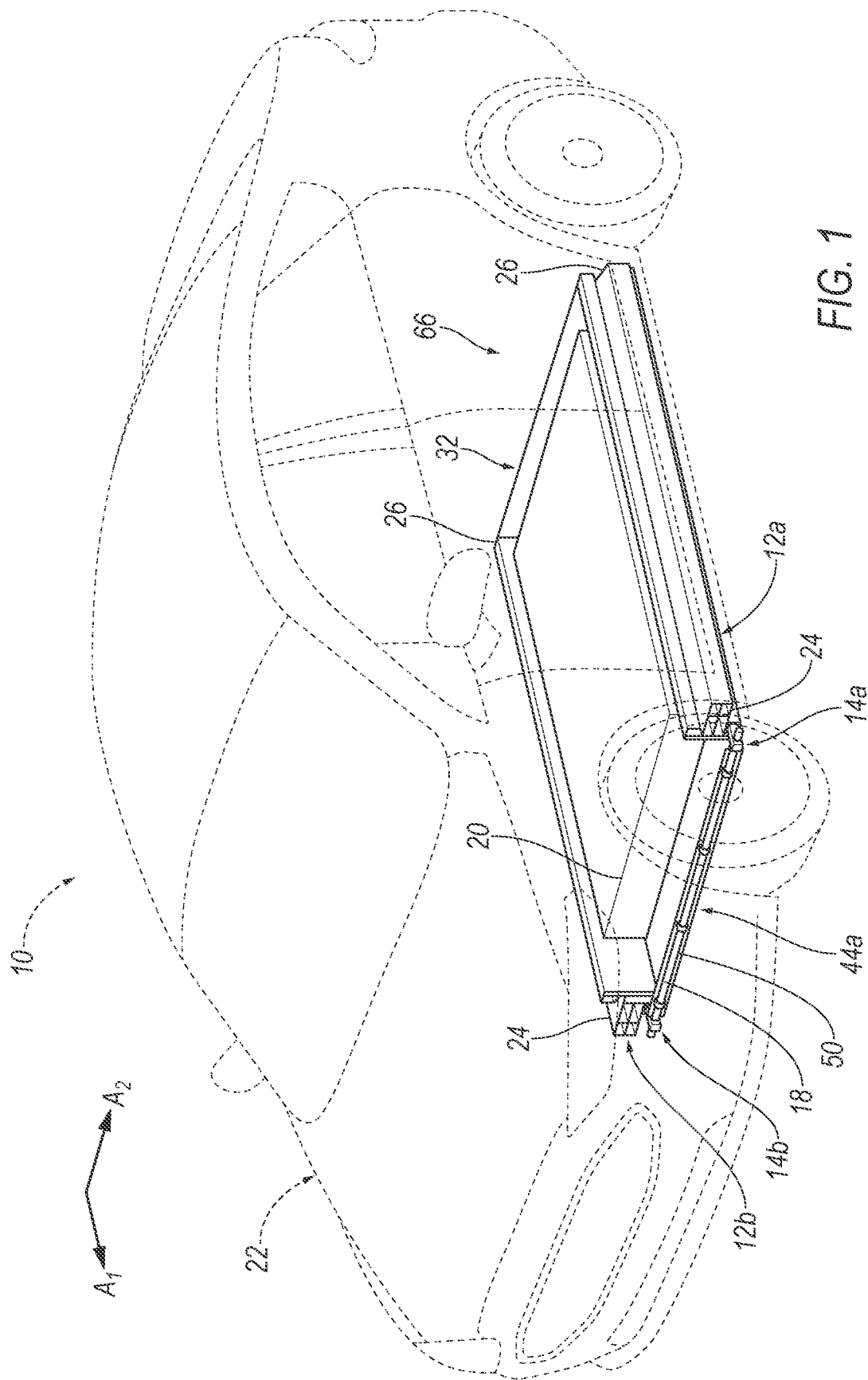
FIG. 1 is a perspective view of an electric vehicle including an example restraint system.

An electric vehicle includes a first rocker and a second rocker spaced from each other. A first slider is slideably engaged with the first rocker. A second slider is slideably engaged with the second rocker. A first pyrotechnic actuator is supported by the first rocker and is configured to slide the first slider relative to the first rocker. A second pyrotechnic actuator is supported by the second rocker and is configured to slide the second slider relative to the second rocker. A cable extends from the first slider to the second slider.

The cable may be fixed to the first and second sliders. The cable may be under tension between the first and second sliders.

The electric vehicle may include an airbag supported by the cable and being inflatable to an inflated position.

The electric vehicle may include a plate connected to the cable. The airbag may be fixed to the plate.

The airbag may be disposed between the cable and the first and second rockers.

The electric vehicle may include a cover supported by the cable and including a tear seam adjacent to the airbag. The cover may enclose the airbag in an uninflated position, and the airbag may extend through the tear seam in the inflated position.

The electric vehicle may include an electric-vehicle battery supported by the first and second rockers and disposed between the first and second rockers.

The electric vehicle may include an airbag inflatable to an inflated position between the cable and the electric-vehicle battery.

The cable may be disposed vehicle-forward of the first and second rockers.

The first and second sliders may be slidable in a vehicle-forward direction to a deployed position.

The cable may be spaced farther from the first and second rockers when the first and second sliders are in the deployed position than when the first and second sliders are in an undeployed position.

The electric vehicle may include a computer including a processor and a memory storing instructions executable by the processor to control actuation of the first and second pyrotechnic actuators in response to a vehicle impact.

The electric vehicle may include an airbag supported by the cable. The instructions may further include instructions to control inflation of the airbag in response to the vehicle impact.

The first and second rockers each may include a front end generally aligned with each other. The first slider may be disposed at the front end of the first rocker, and the second slider may be disposed at the front end of the second rocker.

The electric vehicle may include a third slider slidably engaged with the first rocker and spaced from the first slider. The electric vehicle may include a fourth slider slideably engaged with the second rocker and spaced from the second slider. The electric vehicle may include a third pyrotechnic actuator supported by the first rocker and configured to slide the third slider relative to the first rocker. The electric vehicle may include a fourth pyrotechnic actuator supported by the second rocker and configured to slide the fourth slider relative to the second rocker. The electric vehicle may include a rear cable extending from the third slider to the fourth slider. The rear cable may be fixed to the third and fourth sliders and may be under tension.

The electric vehicle may include an airbag supported by the cable and a rear airbag supported by the rear cable. The airbag may be disposed between the cable and the first and second rockers, and the rear airbag may be disposed between the rear cable and the first and second rockers.

The electric vehicle may include a computer including a processor and a memory storing instructions executable by the processor to control inflation of the airbag and the rear airbag in response to a vehicle impact.

The first and second sliders may be slidable in a vehicle-forward direction, and the third and fourth sliders may be slidable in a vehicle-rearward direction.

The cable may be disposed vehicle-forward of the first and second rockers, and the rear cable may be disposed vehicle-rearward of the first and second rockers.

The first and second rockers each may include a front end and a rear end spaced from the front end. The first and second sliders may be disposed at the front end of the respective rocker, and the third and fourth sliders may be disposed at the rear end of the respective rocker.

With reference to the Figures, wherein like numerals indicate like parts throughout the several views, an electric vehicle 10 is generally shown. The electric vehicle 10 includes a restraint system 66 having a first rocker 12a and a second rocker 12b spaced from each other. A first slider 14a is slideably engaged with the first rocker 12a. A second slider 14b is slidably engaged with the second rocker 12b. A first pyrotechnic actuator 16a is supported by the first rocker 12a and is configured to slide the first slider 14a relative to the first rocker 12a. A second pyrotechnic actuator 16b is supported by the second rocker 12b and is configured to slide the second slider 14b relative to the second rocker 12b. A cable 18 extends from the first slider 14a to the second slider 14b.

During a vehicle impact of the electric vehicle 10, force on the electric vehicle 10 may force vehicle components towards an electric-vehicle battery 20. For example, during the vehicle impact, an object exerts a force on the electric vehicle 10, which can force vehicle components towards the electric-vehicle battery 20. During the impact, the first and second pyrotechnic actuators 16a, 16b slide the first and second sliders 14a, 14b forward, which moves the cable 18 away from the electric-vehicle battery 20. As the vehicle components move rearward, the vehicle components impact and exert a force on the cable 18, and the cable 18 distributes the force to the rockers 12. This reduces the likelihood of the vehicle components impacting the electric-vehicle battery 20 during the vehicle impact. Specifically, the cable 18 remains connected to the sliders 14 such that the cable 18 remains under tension during the vehicle impact. Thus, during a vehicle impact, the cable 18 directs the force from the vehicle components away from the electric-vehicle battery 20 and towards the rockers 12.

The electric vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The electric vehicle 10 generates propulsion from electric power. Examples of electric vehicles include a battery-electric vehicle (BEV), a hybrid-electric vehicle (HEV), a plug-in hybrid electric vehicles (PHEV), etc. The electric vehicle 10, for example, may be an autonomous vehicle. In other words, the electric vehicle 10 may be autonomously operated such that the electric vehicle 10 may be driven without constant attention from a driver, i.e., the electric vehicle 10 may be self-driving without human input.

The electric vehicle 10 defines a longitudinal axis A1, e.g., extending between a front and a rear of the electric vehicle 10. The electric vehicle 10 defines a lateral axis A2, e.g., extending between a left side and a right side of the electric vehicle 10. The longitudinal axis A1 and the lateral axis A2 are perpendicular to each other.

With reference to FIG. 1, the electric vehicle 10 includes a body 22 and a frame (not numbered). The body 22 and frame may be of a unibody construction. In the unibody construction, the body 22 serves as the frame, and the body 22 is unitary, i.e., a continuous one-piece unit. As another example, the body 22 and frame may have a body-on-frame construction (also referred to as a cab-on-frame construction). In other words, the body 22 and frame are separate components, i.e., are modular, and the body 22 is supported on and affixed to the frame. Alternatively, the body 22 and frame may have any suitable construction. The body 22 and/or the frame may be formed of any suitable material, for example, steel, aluminum, etc.

Figure 2A:
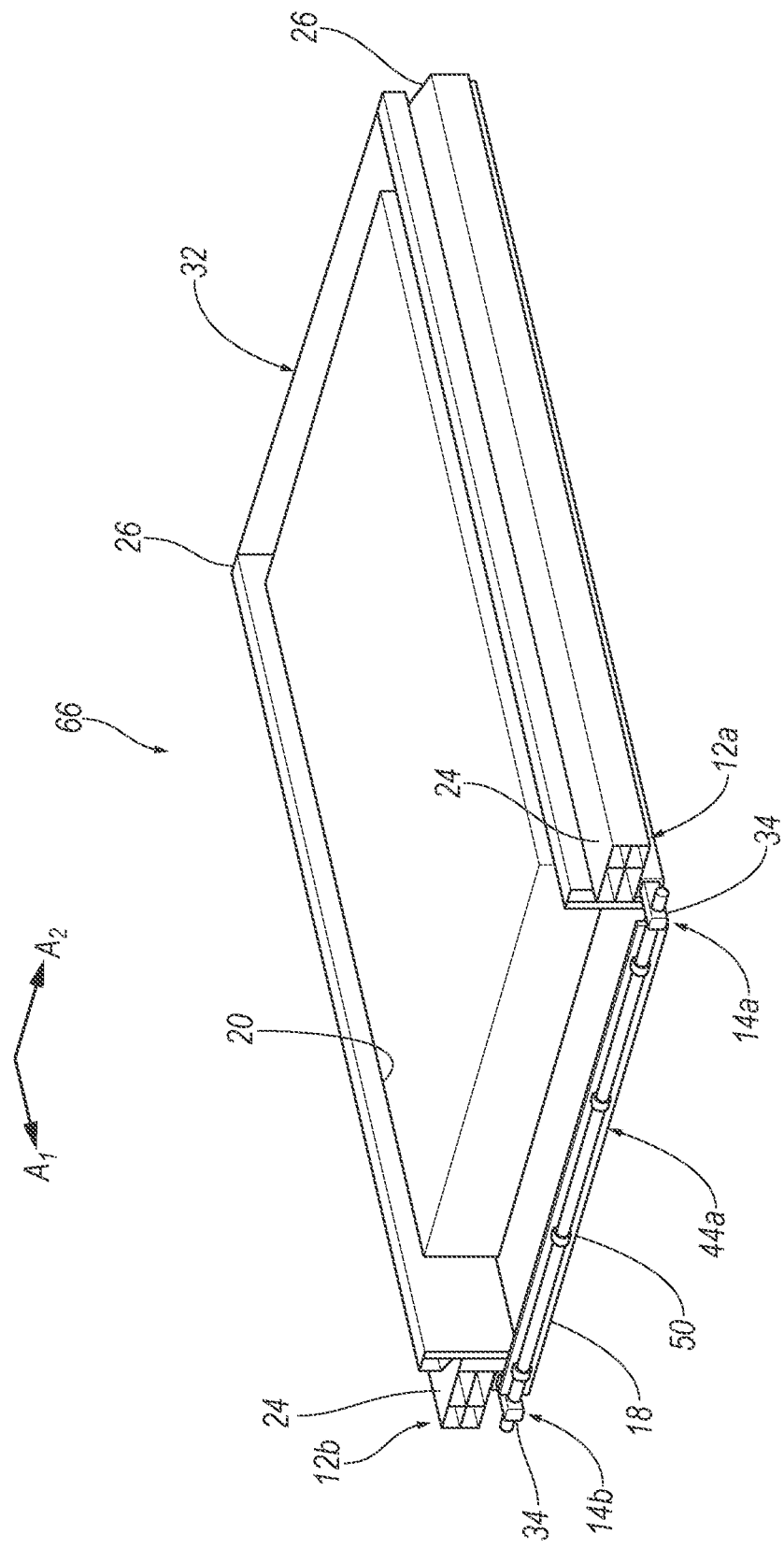
FIG. 2A is a perspective view of the example restraint system including first and second sliders in an undeployed position and an airbag in an uninflated position.
Figure 2B:
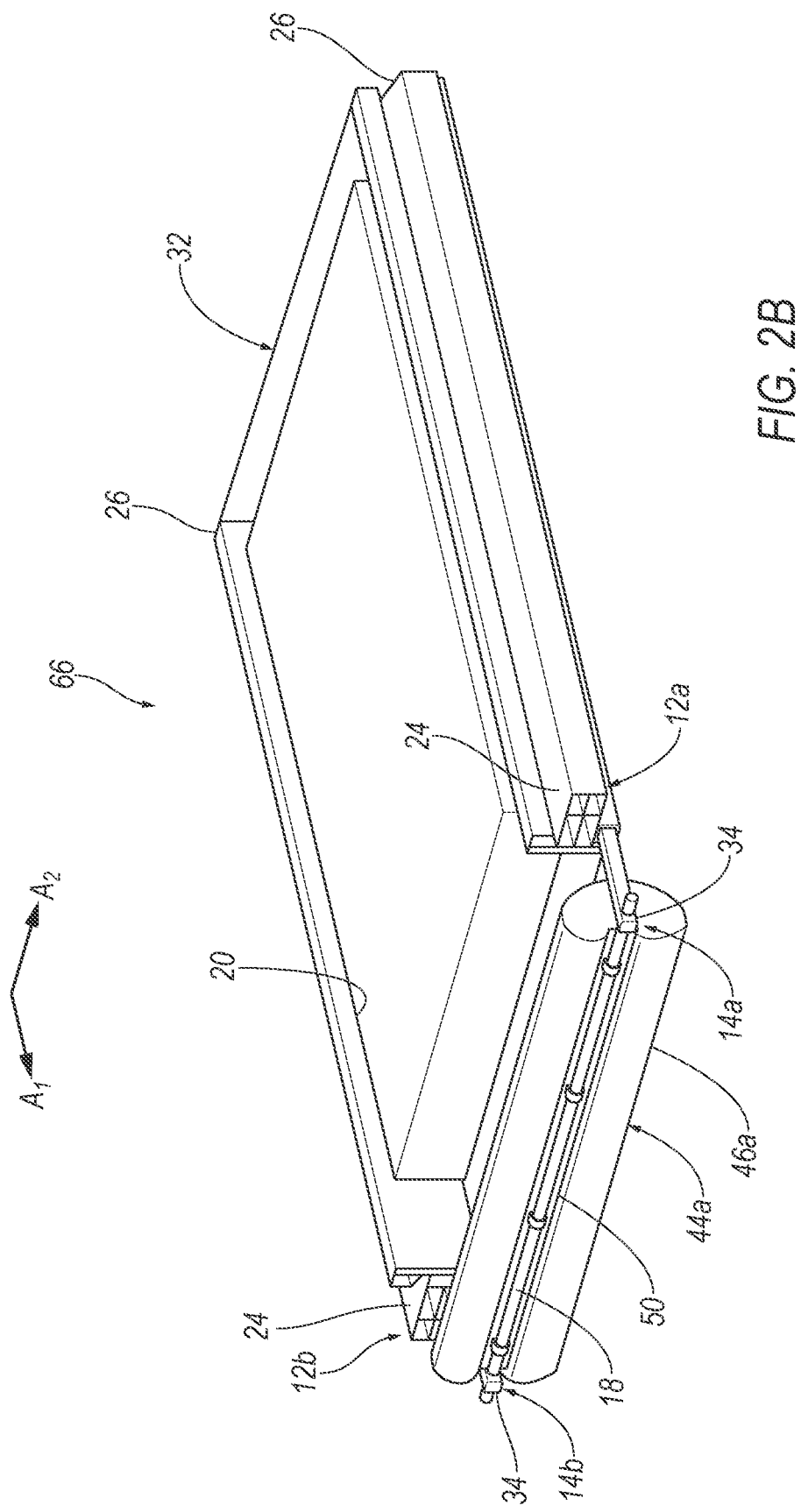
FIG. 2B is a perspective view of the example restraint system including the first and second sliders in a deployed position and the airbag in an inflated position.

With reference to FIGS. 1-2B, the first rocker 12a and the second rocker 12b spaced from each other along the lateral axis A2. In other words, the first rocker 12a is disposed on one side of the electric vehicle 10 and the second rocker 12b is disposed on the other side of the electric vehicle 10. The rockers 12 may be components of the body 22 and/or the frame. The rockers 12 are the lowest portion of a side of the electric vehicle 10. The rockers 12 provide rigidity at the respective side of the electric vehicle 10. The rockers 12 support vehicle components, such as a floor, doors, pillars, etc. Each rocker 12 is elongated along the longitudinal axis A1, e.g., from one wheel well to another wheel well.

Figure 4A:
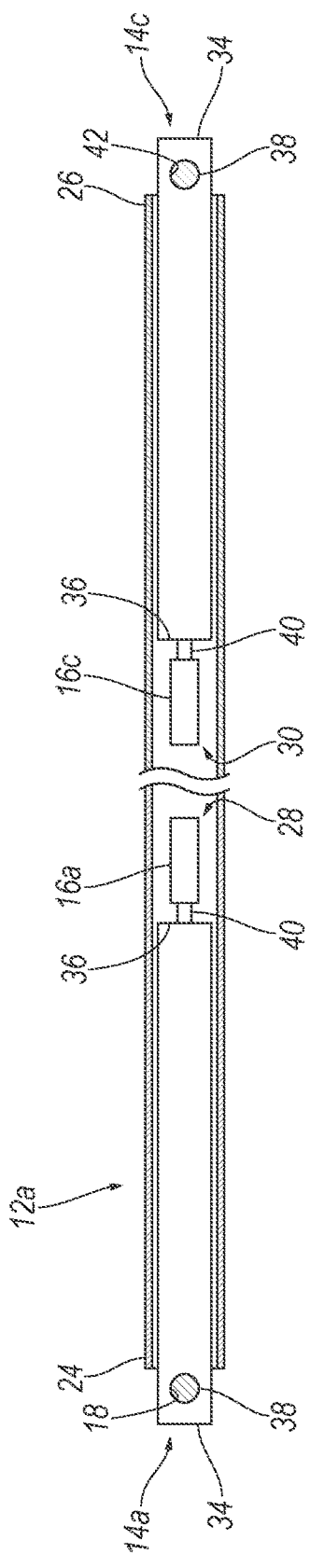
FIG. 4A is a cross-sectional view of an example rocker including example pyrotechnic actuators engaged with example sliders in the undeployed position.
Figure 4B:
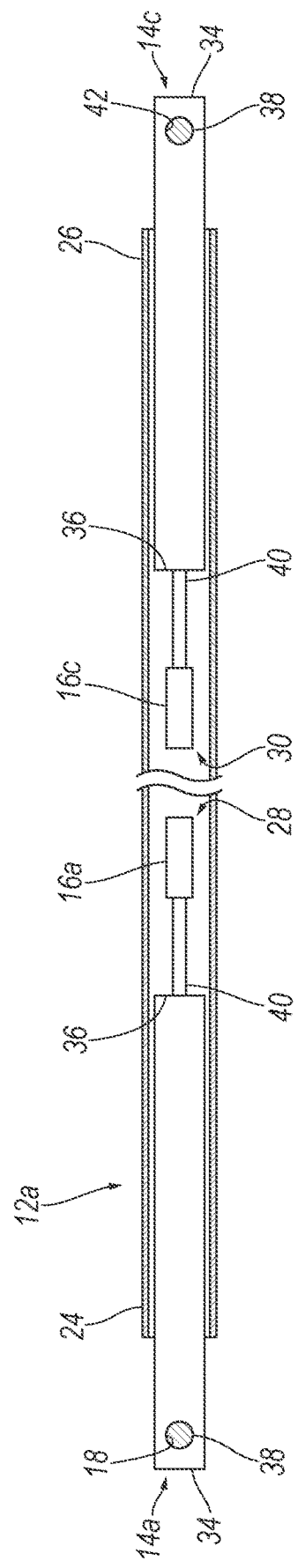
FIG. 4B is a cross-sectional view of the example rocker including the example pyrotechnic actuators engaged with example the sliders in the deployed position.

The first rocker 12a includes a front end 24 and a back end 26 spaced from the front end 24 along the longitudinal axis A1. The first rocker 12a is elongated from the front end 24 to the back end 26. In other words, the longest dimension of the first rocker 12a is along the longitudinal axis A1. The first rocker 12a defines a front cavity 28 elongated from the front end 24 along the longitudinal axis A1, i.e., towards the back end 26, as shown in FIGS. 4A and 4B. Additionally, the first rocker 12a may define a rear cavity 30 elongated from the back end 26 along the longitudinal axis A1, i.e., towards the front end 24, as shown in FIGS. 4A and 4B. The front cavity 28 and the rear cavity 30 may, for example, be connected such that the front and rear cavities 28, 30 define a single cavity extending from the front end 24 to the rear end of the first rocker 12a. As another example, the front and rear cavities 28, 30 may be spaced from each other. In such an example, the front and rear cavities 28, 30 may extend a same or a different amount along the first rocker 12a. The front and rear cavities 28, 30 may extend any suitable amount along the first rocker 12a.

With continued reference to FIGS. 1-3B, the second rocker 12b is substantially identical to the first rocker 12a. For example, the first rocker 12a and the second rocker 12b may be mirror images of each other about the longitudinal axis A1. The second rocker 12b and the first rocker 12a may include common features, e.g., a front end 24, a back end 26, a front cavity 28, a rear cavity 30, etc. Common features among the first and second rockers 12a, 12b shown in the figures are identified with common numerals.

With continued reference to FIGS. 1-3B, an electric-vehicle battery 20 powers propulsion of the electric vehicle 10, e.g., powers a drivetrain motor. The electric-vehicle battery 20 may be of any suitable type for vehicular electrification, for example, lithium-ion batteries, nickel-metal hydride batteries, lead-acid batteries, ultracapacitors, etc. The electric-vehicle battery 20 may include at least one battery module. Each battery module may include one or more battery cells. A battery tray 32 may include a compartment that receives the battery modules. The electric-vehicle battery 20 may include any suitable hardware, e.g., wiring, connectors, circuits, etc., connecting the battery modules to each other and to electrified components of the electric vehicle 10.

The battery tray 32 supports the electric-vehicle battery 20 on the body 22. For example, the electric-vehicle battery 20 may be disposed in and supported by the battery tray 32. The battery tray 32 may be disposed between the rockers 12 along the lateral axis A2. The battery tray 32 may be fixed to the body 22, e.g., to the rockers 12, the floor, etc. The battery tray 32 may be fixed directly, or indirectly via one or more intermediate components, to the body 22, e.g., via fasteners, welding, etc.

The battery tray 32 may include panels that, e.g., a bottom panel (not numbered), a top panel (not shown), and side panels (not numbered), that enclose the electric-vehicle battery 20. The panels may prevent intrusion of precipitation and dirt to the electric-vehicle battery 20. The top panel may separate the electric-vehicle battery 20 from components of the electric vehicle 10 above the battery tray 32, e.g., a passenger compartment.

The first and second sliders 14a, 14b are designed, i.e., sized and shaped, to maintain a tensile force in the cable 18 that can oppose movement of vehicle components towards the electric-vehicle battery 20, as discussed below. The first and second sliders 14*a*, 14*b* may have any suitable size, e.g., perimeter, area, etc. The first and second sliders 14*a*, 14*b* may have any suitable shape, e.g., rectangle, square, etc. The first and second sliders 14*a*, 14*b* may be any suitable material, e.g., metal, plastic, etc.

Figure 3A:
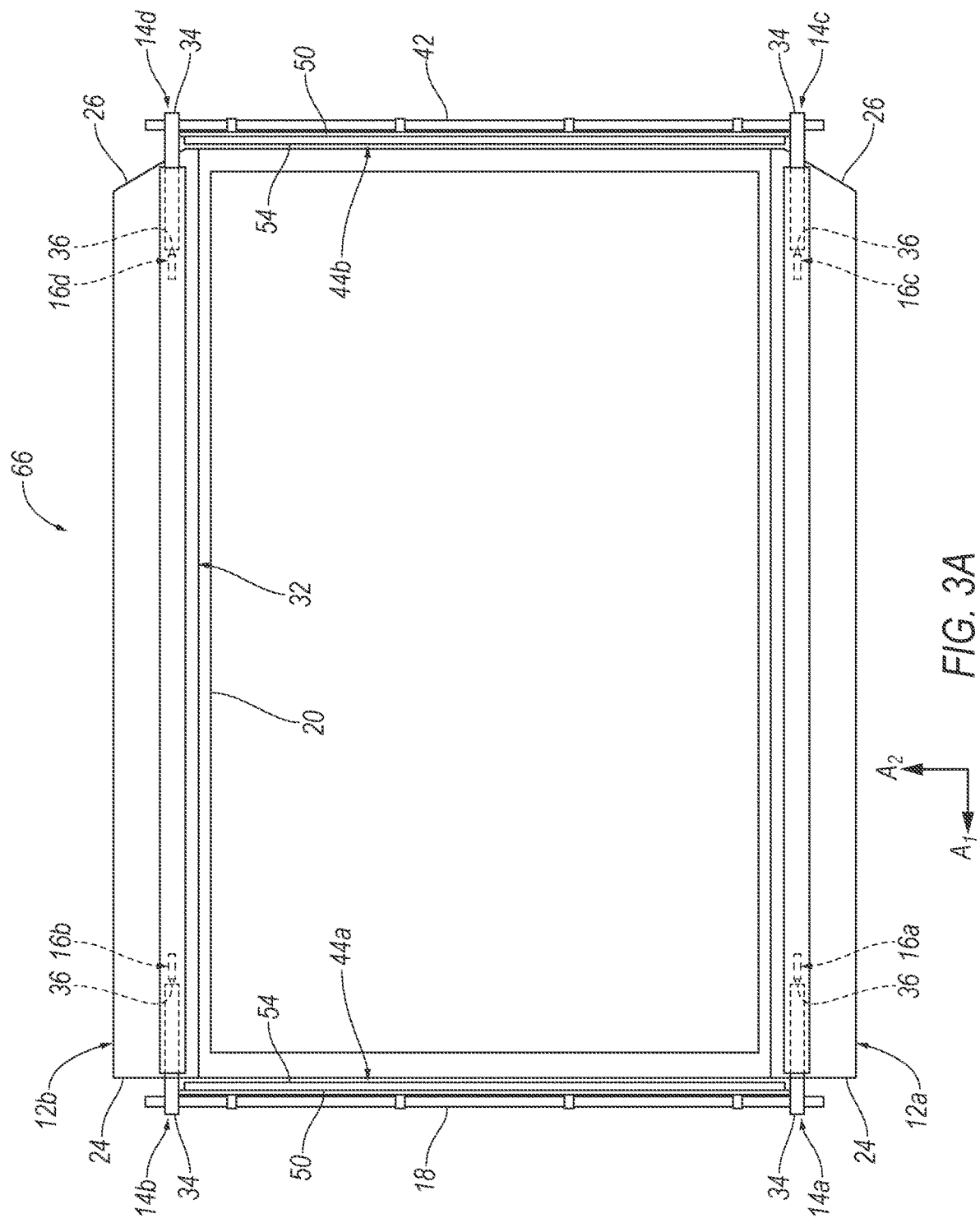
FIG. 3A is a top view of another example restraint system including third and fourth sliders in the undeployed position and a rear airbag in the uninflated position.
Figure 3B:
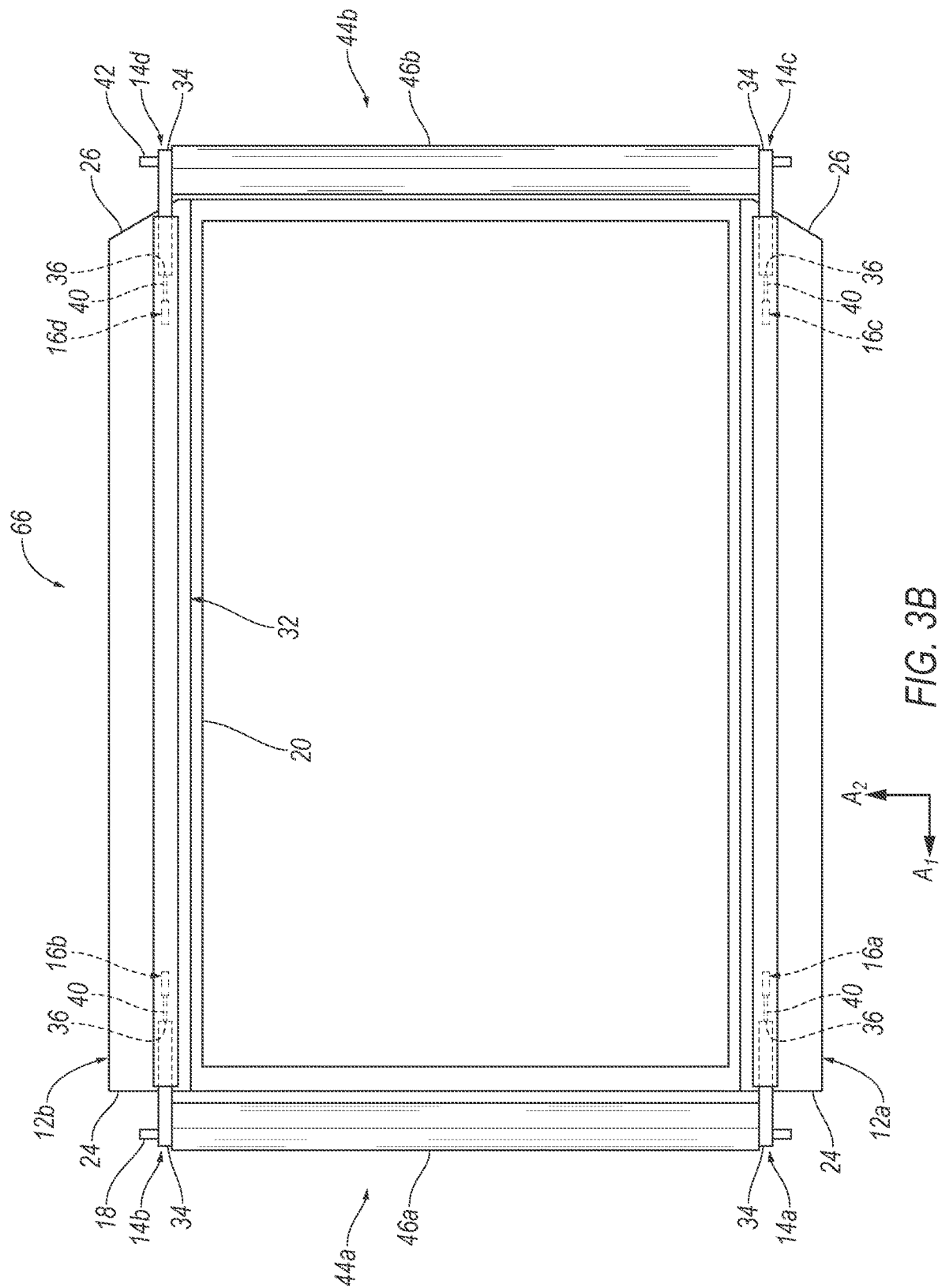
FIG. 3B is a top view of the example restraint system of FIG. 3A including the third and fourth sliders in the deployed position and the rear airbag in the inflated position.

The first and second sliders 14*a*, 14*b* are slidable from an undeployed position, as shown in FIGS. 2A, 3A, and 4A, to a deployed position, as shown in FIGS. 2B, 3B, and 4B, by the first and second pyrotechnic actuators 16*a*, 16*b*, respectively (as described below). Specifically, the first slider 14*a* slides relative to the first rocker 12*a* from the undeployed position to the deployed position, and the second slider 14*b* slides relative to the second rocker 12*b* from the undeployed position to the deployed position. The first and second sliders 14*a*, 14*b* are slidable along the longitudinal axis A1 away from the back ends 26 of the rockers 12. That is, the first and second sliders 14*a*, 14*b* are slidable in a vehicle-forward direction, i.e., towards the front of the electric vehicle 10.

The first slider 14*a* is disposed at the front end 24 of the first rocker 12*a*, as shown in the Figures. For example, the first slider 14*a* may be received in the front cavity 28 of the first rocker 12*a*, as shown in FIGS. 4A and 4B. The first slider 14*a* is slidable relative to the first rocker 12*a* to the deployed position. That is, the first slider 14*a* may be sized to be slidable within the front cavity 28 of the first rocker 12*a*. The first rocker 12*a* may include a stop (not shown) in the front cavity 28 that engages a lip (not shown) on the first slider 14*a* to stop relative sliding of the first slider 14*a* in the vehicle-forward direction.

Additionally, the first rocker 12*a* and the first slider 14*a* may include locking elements (not shown) engageable with each other to prevent relative sliding of the first slider 14*a* in the vehicle-rearward direction. When the first slider 14*a* is in the undeployed position, the locking elements are disengaged from each other. In this situation, the first slider 14*a* can move relative to the first rocker 12*a*. When the first slider 14*a* is in the deployed position, the respective locking elements are engaged with each other. In this situation, the first slider 14*a* is locked with the first rocker 12*a*, i.e., fixed relative to the first rocker 12*a*. That is, the first slider 14*a* is maintained in the deployed position when the respective locking elements are engaged with each other.

The locking elements may, for example, include a finger and an opening. As one example, the first slider 14*a* can include the finger extending from a side of the first slider 14*a* to a side of the first rocker 12*a*. The finger can be biased, e.g., by a spring, away from the side of the first slider 14*a*. That is, the fingers may abut the side of the first rocker 12*a* when the first slider 14*a* is in the undeployed position and while the first slider 14*a* moves to the deployed position. Additionally, the first rocker 12*a* can include the opening disposed on the side of the rocker 12*a*. The opening is designed to receive the finger of the first slider 14*a* when the first slider 14*a* is in the deployed position. That is, when the first slider 14*a* is in the deployed position, the finger is biased into the opening of the first rocker 12*a*. When the finger is in the opening, the opening retains the finger, which prevents the first slider 14*a* from moving to the undeployed position. The opening have any suitable shape, e.g., elliptical, circular, etc. The first slider 14*a* may include any suitable number of fingers, and the first rocker 12*a* may include a corresponding number of openings.

With reference to FIGS. 3A-4B, the first slider 14*a* may include a first end 34 and a second end 36 spaced from the first end 34 along the longitudinal axis A1. The first slider 14*a* may be elongated from the first end 34 to the second end 36. The second end 36 of the first slider 14*a* may be disposed in the front cavity 28 of the first rocker 12*a*. The second end 36 of the first slider 14*a* is engaged with the first pyrotechnic actuator 16*a*.

In the undeployed position, the first end 34 of the first slider 14*a* may be disposed at any suitable position relative to the front end 24 of the first rocker 12*a*. For example, the first end 34 of the first slider 14*a* may be disposed vehicle-forward of the front end 24 of the first rocker 12*a* in the undeployed position, as shown in the Figures. As another example, the first end 34 of the first slider 14*a* may be disposed vehicle-rearward of the front end 24 of the first rocker 12*a* in the undeployed position. As yet another example, the first end 34 of the first slider 14*a* may be generally aligned with the front end 24 of the first rocker 12*a* along the longitudinal axis A1 in the undeployed position. In this context, "generally" means that an axis extending from the front end 24 of the first rocker 12*a* to the front end 24 of the second rocker 12*b* extends generally along the longitudinal axis A1, even if the axis deviates from parallel.

In the deployed position, the first end 34 of the first slider 14*a* is disposed vehicle-forward of the front end 24 of the first rocker 12*a*. In other words, the deployed position is vehicle-forward of the undeployed position. The first end 34 of the first slider 14*a* in the deployed position may be spaced from the front end 24 of the first rocker 12*a* by any suitable amount. The first end 34 of the first slider 14*a* may, for example, be disposed farther from the front end 24 of the first rocker 12*a* along the longitudinal axis A1 when the first slider 14*a* is in the deployed position than when the first slider 14*a* is in the undeployed position.

The first slider 14*a* may include a hole 38 disposed adjacent to the first end 34 and extending through the first slider 14*a*. The hole 38 may be designed, i.e., sized and shaped, to receive the cable 18. The hole 38 may include a feature for threadedly engaging the cable 18. For example, the hole 38 may include threads. As another example, a weld nut may be disposed in the hole 38.

With continued reference to FIGS. 3A-4B, the second slider 14*b* is received in the front cavity 28 of the second rocker 12*b*. That is, the second slider 14*b* is disposed at the front end 24 of the second rocker 12*b*. The second slider 14*b* is slidable relative to the second rocker 12*b* to a deployed position. That is, the second slider 14*b* may be sized to be slidable within the front cavity 28 of the second rocker 12*b*.

The second slider 14*b* may be substantially identical to the first slider 14*a*. For example, the first and second sliders 14*a*, 14*b* may be mirror images of each other about the longitudinal axis A1. For example, the second slider 14*b* in the undeployed position may mirror the first slider 14*a* in the undeployed position, and the second slider 14*b* in the deployed position may mirror the first slider 14*a* in the deployed position. The second slider 14*b* and the first slider 14*a* may include common features, e.g., a first end 34, a second end 36, a hole 38, etc. Common features among the first and second sliders 14*a*, 14*b* shown in the figures are identified with common numerals. The hole 38 of the second slider 14*b* is generally aligned with the hole 38 of the first slider 14*a* relative to the longitudinal axis A1.

The restraint system 66 may include a third slider 14*c* slidably engaged with the first rocker 12*a*, and a fourth slider 14*d* slidably engaged with the second rocker 12*b*, as shown in FIGS. 4A-4B. The third and fourth sliders 14*c*, 14*d* are slidable from the undeployed position to the deployed position by third and fourth pyrotechnic actuators 16*c*, 16*d*, respectively (as described below). Specifically, the third slider 14*c* slides relative to the first rocker 12*a* from the undeployed position to the deployed position, and the fourth slider 14*d* slides relative to the second rocker 12*b* from the undeployed position to the deployed position. The third and fourth sliders 14*c*, 14*d* are slidable along the longitudinal axis A1 away from the front ends 24 of the rockers 12. That is, the third and fourth sliders 14*c*, 14*d* are slidable in a vehicle-rearward direction, i.e., towards the rear of the electric vehicle 10.

The third slider 14*c* may be spaced from the first slider 14*a* along the longitudinal axis A1. For example, the third slider 14*c* may be received by the rear cavity 30 of the first rocker 12*a*, as shown in FIGS. 4A and 4B. That is, the third slider 14*c* may be disposed at the back end 26 of the first rocker 12*a*. The third slider 14*c* is slidable relative to the first rocker 12*a* to the deployed position. That is, the third slider 14*c* may be sized to be slidable within the rear cavity 30 of the first rocker 12*a*.

The third slider 14*c* may be substantially identical to the first slider 14*a*. For example, the first and third sliders 14*a*, 14*c* may be mirror images of each other about the lateral axis A2, as shown in FIGS. 3A and 3B. For example, the third slider 14*c* in the undeployed position may mirror the first slider 14*a* in the undeployed position, and the third slider 14*c* in the deployed position may mirror the first slider 14*a* in the deployed position. The third slider 14*c* and the first slider 14*a* may include common features, e.g., a first end 34, a second end 36, a hole 38, etc. Common features among the first and third sliders 14*a*, 14*c* shown in the figures are identified with common numerals.

The fourth slider 14*d* may be spaced from the second slider 14*b* along the longitudinal axis A1. For example, the fourth slider 14*d* may be received by the rear cavity 30 of the second rocker 12*b*, as shown in FIGS. 4A and 4B. The fourth slider 14*d* may be disposed at the back end 26 of the second rocker 12*b*. The fourth slider 14*d* is slidable relative to the second rocker 12*b* to the deployed position. That is, the fourth slider 14*d* may be sized to be slidable within the rear cavity 30 of the second rocker 12*b*.

The fourth slider 14*d* may be substantially identical to the second slider 14*b*. For example, the second and fourth sliders 14*b*, 14*d* may be mirror images of each other about the lateral axis A2, as shown in FIGS. 3A and 3B. For example, the fourth slider 14*d* in the undeployed position may mirror the second slider 14*b* in the undeployed position, and the fourth slider 14*d* in the deployed position may mirror the second slider 14*b* in the deployed position. The second slider 14*b* and the fourth slider 14*d* may include common features, e.g., a first end 34, a second end 36, a hole 38, etc. Common features among the second and fourth sliders 14*b*, 14*d* shown in the figures are identified with common numerals. The hole 38 of the fourth slider 14*d* is generally aligned with the hole 38 of the third slider 14*c* relative to the longitudinal axis A1.

The first pyrotechnic actuator 16*a* may be supported by the first rocker 12*a*, as shown in FIGS. 3A-4B. For example, the first pyrotechnic actuator 16*a* may be mounted to the first rocker 12*a* in the front cavity 28. For example, the first pyrotechnic actuator 16*a* may include locating elements, fastener, etc., that engage the first rocker 12*a*. Additionally, or alternatively, fasteners may engage the first pyrotechnic actuator 16*a* and the first rocker 12*a* to mount the first pyrotechnic actuator 16*a* to the first rocker 12*a*. Additionally, the first pyrotechnic actuator 16*a* is connected to the first slider 14*a*, e.g., the second end 36. As an example, a rigid bar 40 may extend from the first pyrotechnic actuator 16 to the first slider 14*a*. The rigid bar 40 may be connected to the first slider 14*a*, e.g., via fasteners, welding, etc.

The first pyrotechnic actuator 16*a* is configured to push the first slider 14*a* to the deployed position. That is, the first pyrotechnic actuator 16*a* is operable to push the second end 36 of the first slider 14*a* along the longitudinal axis A1 toward the front of the electric vehicle 10, i.e., in the vehicle-forward direction. Specifically, the first pyrotechnic actuator 16*a* is positioned such that the first pyrotechnic actuator 16*a* is elongated along the longitudinal axis A1, as shown in FIGS. 3A-4B. The first pyrotechnic actuator 16*a* is actuated in response to a vehicle impact, as discussed below. Since the first pyrotechnic actuator 16*a* is connected to the first slider 14*a* by the rigid bar 40, the first pyrotechnic actuator 16*a* pushes the first slider 14*a* along the longitudinal axis A1. The first pyrotechnic actuator 16*a* may linearly extend the rigid bar 40. When the first pyrotechnic actuator 16*a* extends the rigid bar 40, the rigid bar 40 transmits a force to push the first slider 14*a* along the longitudinal axis A1. Additionally, the first pyrotechnic actuator 16*a* may be configured to prevent the first slider 14*a* from moving to the undeployed position from the deployed position, i.e., in the vehicle-rearward direction.

The first pyrotechnic actuator 16*a* is pyrotechnically actuated. The first pyrotechnic actuator 16*a* may be any actuator that ignites a combustible material. For example, the first pyrotechnic actuator 16*a* may include a pyrotechnic charge that produces gas or otherwise rapidly expands upon actuation. Specifically, the first pyrotechnic actuator 16*a* may include a cylinder and a piston and pyrotechnic charge in the cylinder. The piston is connected to the rigid bar 40 and the pyrotechnic charge is ignited to slide the piston along the cylinder, i.e., moving the piston and the rigid bar 40 relative to the first rocker 12*a*. In response to a vehicle impact, as discussed further below, the first pyrotechnic actuator 16*a* actuates to move the piston. The first pyrotechnic actuator 16*a* may, for example, be actuated simultaneously to the inflation of an airbag 46*a*, as discussed below. As another example, the first pyrotechnic actuator 16*a* may be actuated prior to the inflation of the airbag 46*a*.

The second pyrotechnic actuator 16*b* may be supported by the second rocker 12*b*, e.g., in substantially the same manner as discussed above regarding the first pyrotechnic actuator 16*a*, as shown in FIGS. 3A-4B. Additionally, the second pyrotechnic actuator 16*b* may be connected to the second slider 14*b*, e.g., in substantially the same manner as discussed above regarding the first pyrotechnic actuator 16*a*.

The second pyrotechnic actuator 16*b* may be substantially identical to the first pyrotechnic actuation. For example, the second pyrotechnic actuator 16*b* and the first pyrotechnic actuator 16*a* may be mirror images of each other about the longitudinal axis A1. The second pyrotechnic actuator 16*b* may be configured to push the second slider 14*b* to the deployed position, e.g., in substantially the same manner as discussed above with regards to the first pyrotechnic actuator 16*a*. The second pyrotechnic actuator 16*b* is actuated simultaneously to the first pyrotechnic actuator 16*a*, e.g., in response to the vehicle impact. Actuating the first and second pyrotechnic actuators 16*a*, 16*b* simultaneously maintains the general alignment of the holes 38 of the first and second sliders 14*a*, 14*b* during movement to the deployed position.

In an example in which the restraint system 66 includes the third and fourth sliders 14*c*, 14*d*, the restraint system 66 includes third and fourth pyrotechnic actuators 16*c*, 16*d*, as shown in FIGS. 3A-4B. The third pyrotechnic actuator 16*c* may be supported by the first rocker 12*a*, e.g., in substantially the same manner as discussed above regarding the first pyrotechnic actuator 16a. The third pyrotechnic actuator 16c may be spaced from the first pyrotechnic actuator 16a along the longitudinal axis A1. For example, the third pyrotechnic actuator 16c may be disposed in the rear cavity 30 of the first rocker 12a. Additionally, the third pyrotechnic actuator 16c may be connected to the third slider 14c, e.g., in substantially the same manner as discussed above regarding the first pyrotechnic actuator 16a.

The third pyrotechnic actuator 16c may be substantially identical to the first pyrotechnic actuator 16a. For example, the third pyrotechnic actuator 16c and the first pyrotechnic actuator 16a may be mirror images of each other about the lateral axis A2. The third pyrotechnic actuator 16c may be configured to push the third slider 14c to the deployed position. That is, the third pyrotechnic actuator 16c is operable to push the second end 36 of the third slider 14c along the longitudinal axis A1 toward the back of the electric vehicle 10, i.e., in the vehicle-rearward direction.

The fourth pyrotechnic actuator 16d may be supported by the second rocker 12b, e.g., in substantially the same manner as discussed above regarding the first pyrotechnic actuator 16a. The fourth pyrotechnic actuator 16d may be spaced from the second pyrotechnic actuator 16b along the longitudinal axis A1. For example, the fourth pyrotechnic actuator 16d may be disposed in the rear cavity 30 of the second rocker 12b. Additionally, the fourth pyrotechnic actuator 16d may be connected to the fourth slider 14d, e.g., in substantially the same manner as discussed above regarding the first pyrotechnic actuator 16a.

The fourth pyrotechnic actuator 16d may be substantially identical to the second pyrotechnic actuator 16b. For example, the fourth pyrotechnic actuator 16d and the second pyrotechnic actuator 16b may be mirror images of each other about the lateral axis A2. The fourth pyrotechnic actuator 16d may be configured to push the fourth slider 14d to the deployed position, e.g., in substantially the same manner as discussed above with regards to the third pyrotechnic actuator 16c. The fourth pyrotechnic actuator 16d is actuated simultaneously to the third pyrotechnic actuator 16c, e.g., in response to the vehicle impact. Actuating the third and fourth pyrotechnic actuators 16c, 16d simultaneously maintains the general alignment of the holes 38 of the third and fourth sliders 14c, 14d during movement to the deployed position.

As set forth above, the cable 18 extends from the first slider 14a to the second slider 14b, as shown in FIGS. 1-3B. Specifically, the cable 18 extends through the holes 38 of the first and second sliders 14a, 14b. That is, the cable 18 extends from one side of the electric vehicle 10 to the other side of the electric vehicle 10. The cable 18 is elongated along the lateral axis A2. The cable 18 is vehicle-forward of the battery tray 32.

The cable 18 includes two ends (not numbered) spaced from each other and generally aligned with each other relative to the longitudinal axis A1. One end is fixed relative to the first slider 14a and the other ends is fixed relative to the second slider 14b. For example, the ends may be threaded and threadedly engaged with the respective slider, e.g., via the weld nut. Alternatively, the ends may be connected directly, or indirectly via one or more intermediate components, to the respective slider via fasteners, welding, etc.

The cable 18 is designed, i.e., sized and shaped, to oppose movement of vehicle components towards the electric-vehicle battery 20 during a vehicle-frontal impact. The cable 18 may, for example, include several strands of wire that are bonded, twisted, and/or braided together into the shape of a helix. The cable 18 may be designed to have a high tensile strength for transferring heavy loads between the rockers 12, e.g., via the sliders 14. The cable 18 may have any suitable diameter. The cable 18 may be made of any suitable material such as metal, etc.

The cable 18 is pre-tensioned. Specifically, the cable 18 is under tension between the first slider 14a and the second slider 14b absent force applied by vehicle components, i.e., before an impact that forces the vehicle components into the cable 18. In other words, the cable 18 is taught with tensile force between the rockers 12. A vehicle-frontal impact may force the vehicle components vehicle rearward. Since the cable 18 is under tension before force is applied by the vehicle components, the cable 18 distributes the force distributed to the vehicle components during the vehicle impact to the rockers 12, which can assist in opposing movement of the vehicle components during the vehicle impact and reducing the likelihood of vehicle components impacting the electric-vehicle battery 20.

In an example in which the restraint system 66 includes the third and fourth sliders 14c, 14d, the restraint system includes a rear cable 42, as shown in FIGS. 3A and 3B. The rear cable 42 is designed, i.e., sized and shaped, to oppose movement of vehicle components towards the electric-vehicle battery 20 during a vehicle-rearward impact. The rear cable 42 is substantially identical to the cable 18.

The rear cable 42 extends from the third slider 14c to the fourth slider 14d, as shown in FIGS. 3A and 3B. Specifically, the rear cable 42 extends through the holes 38 of the third and fourth sliders 14c, 14d. That is, the rear cable 42 extends from one side of the electric vehicle 10 to the other side of the electric vehicle 10. The rear cable 42 is elongated along the lateral axis A2. The rear cable 42 is vehicle-rearward of the cable 18 and the battery tray 32.

The rear cable 42 includes two ends (not numbered) spaced from each other and generally aligned with each other relative to the longitudinal axis A1. One end is fixed relative to the third slider 14c and the other ends is fixed relative to the fourth slider 14d, e.g., in substantially the same manner as discussed above in regards to the ends of the cable 18 being connected to the first and second sliders 14a, 14b.

Figure 5A:
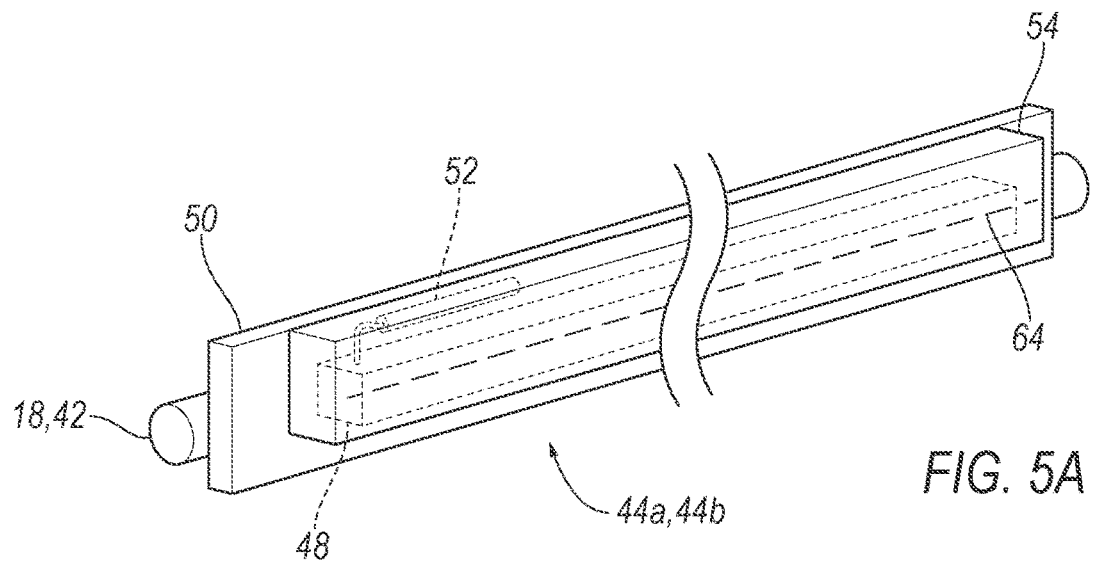
FIG. 5A is a perspective view of an example airbag assembly including the airbag in the uninflated position.
Figure 5B:
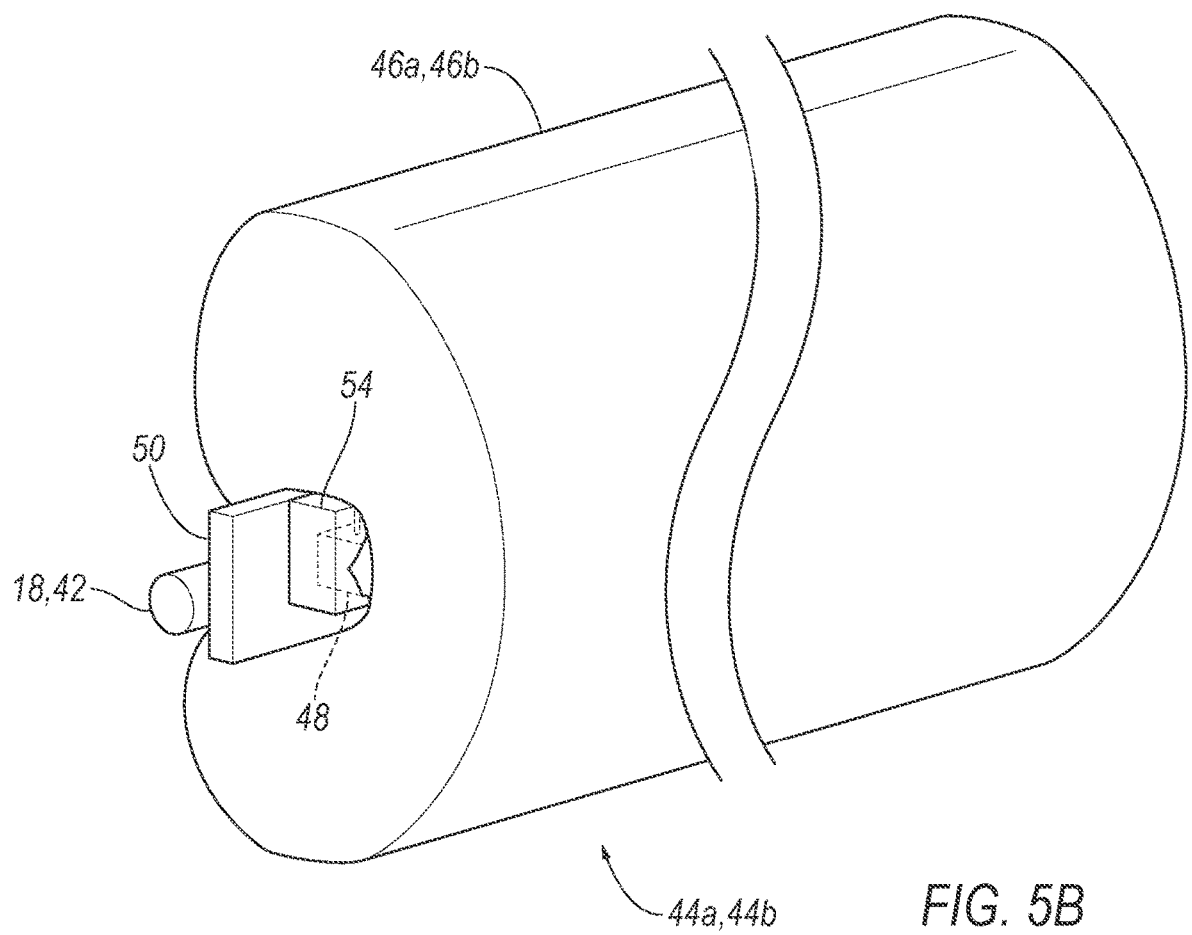
FIG. 5B is a perspective view of the example airbag assembly including the airbag in the inflated position.

With reference to FIGS. 5A and 5B, the restraint system 66 may include an airbag assembly 44a, which includes the airbag 46a inflatable from an uninflated position to an inflated position, a housing 48, a plate 50, and an inflator 52. The cable 18 may support the airbag assembly 44a, and specifically, may support the airbag 46a when the airbag 46a is in the inflated position, as shown in FIG. 5B. The airbag assembly 44a may be mounted to the cable 18, as discussed further below.

The housing 48 houses the airbag 46a in an uninflated position, as shown in FIG. 5A, and supports the airbag 46a in the inflated position. The airbag 46a may be rolled and/or folded to fit within the housing 48 in the uninflated position. The housing 48 may be of any suitable material, e.g., a rigid polymer, a metal, a composite, or a combination of rigid materials. The housing 48 may, for example, include clips, panels, etc. for attaching the airbag 46a to the housing 48. The housing 48 may be fixed to the plate 50, e.g., via fasteners, welding, etc.

The plate 50 may be disposed between the cable 18 and the housing 48. Additionally, the plate 50 may be disposed between the first and second sliders 14a, 14b, as shown in FIGS. 1-3B. The plate 50 may be elongated along the lateral axis A2. For example, the plate 50 may extend from the first slider 14*a* to the second slider 14*b*. The plate 50 may mounted to the cable 18. For example, the plate 50 can include clamps, hooks, etc., configured to engage the cable 18. Additionally, or alternatively, the plate 50 may be fixed relative to the first ends 34 of the sliders 14, e.g., via fasteners, welding, etc. The plate 50 may be any suitable material, e.g., metal.

Returning to FIGS. 5A and 5B, the airbag assembly 44*a* may include a cover 54 supported by the plate 50. The cover 54 may enclose the airbag 46*a* in the uninflated position. The cover 54 may assist in preventing debris, water, etc., from contacting the airbag 46*a* during operation of the electric vehicle 10. The cover 54 may be any suitable material, e.g., plastic, rubber, etc.

The cover 54 may include a tear seam 64. The tear seam 64 may be disposed adjacent to the airbag 46*a*. Said differently, the airbag 46*a* may extend through the tear seam 64 in the inflated position. The tear seam 64 may have any suitable shape. For example, the tear seam 64 may have a linear shape, e.g., extending in a line along the lateral axis A2.

The tear seam 64 may be designed to tear apart when subjected to a tensile force above a threshold magnitude. In other words, the cover 54 on one side of the tear seam 64 separates from the cover 54 on the other side of the tear seam 64 when the force is above the threshold magnitude. The threshold magnitude may be chosen to be greater than forces from, e.g., inadvertent pushing against the cover 54 by debris but be less than forces from the deployment of the airbag 46*a*. The tear seam 64 may be, for example, a line of perforations through the cover 54, a line of thinner cover material than the rest of the cover 54, etc.

The airbag 46*a* may be formed of any suitable airbag material, e.g., from a woven polymer. For example, the airbag 46*a* may be formed of lightweight high strength orientated-strand fabric material, e.g., from ultra-high molecular weight polyethylene (UHMwPE), such as that commercially available under the tradename Dyneema®, auxetic yarn, etc., to resist tearing and/or puncturing. Other suitable examples include woven nylon yarn, e.g., nylon, polyether ether ketone (PEEK), polyetherketoneketone (PEKK), polyester, or any other suitable polymer. The woven polymer may include a coating such as silicone, neoprene, urethane, polyorganosiloxane, etc.

The airbag 46*a* may be a single continuous unit, e.g., a single piece of fabric. Alternatively, the airbag 46*a* may include a plurality of segments, i.e., two or more. The segments may be attached to each other in any suitable fashion, e.g., a plurality of panels attached by stitching, ultrasonic welding, etc.

The airbag 46*a* is supported by the cable 18. For example, the airbag assembly 44*a* may be supported by the cable 18. Specifically, the plate 50 may be mounted to the cable 18. The airbag 46*a* is disposed vehicle-rearward of the cable 18, as shown in FIGS. 1-3B. The airbag 46*a* may, for example, be disposed in the cover 54 in the uninflated position, as shown in FIG. 5A. In other words, the cover 54 may cover the airbag 46*a* in the uninflated position.

The inflated position may be the position of the airbag 46*a* at the end of inflation by the inflator 52, i.e., just before the inflator 52 is exhausted. In the inflated position, the airbag 46*a* may extend through the cover 54, e.g., the tear seam 64 adjacent to the airbag 46*a*, as shown in FIG. 5B. In this situation, the airbag 46*a* may extend toward the electric-vehicle battery 20. Said differently, the airbag 46*a* may extend in the vehicle-rearward direction, i.e., away from the cable 18, in the inflated position, as shown in FIGS. 2B and 3B. Specifically, in the inflated position, the airbag 46*a* may be positioned to receive and be impacted by the electric-vehicle battery 20. Additionally, the airbag 46*a* may extend along the lateral axis A2 in the inflated position. For example, the airbag 46*a* may extend from the first slider 14*a* to the second slider 14*b*. As another example, the airbag 46*a* may be spaced from at least one of the sliders.

The inflator 52 is in fluid communication with the airbag 46*a*. The inflator 52 expands the airbag 46*a* with inflation medium, such as a gas, to move the airbag 46*a* from the uninflated position to the inflated position. The inflator 52 may be supported by the plate 50 or any other suitable component in the electric vehicle 10, e.g., the housing 48, the floor, etc. The inflator 52 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 52 may be, for example, at least partially in the inflation chamber to deliver inflation medium directly to the inflation chamber or may be connected to the inflation chamber through fill tubes, diffusers, etc.

In an example in which the restraint system 66 includes the rear cable 42, the restraint system 66 may include a rear airbag assembly 44*b* supported by the rear cable 42, e.g., in substantially the same manner as discussed above regarding the airbag assembly 44*a* being supported by the cable 18, as shown in FIGS. 3A and 3B. The rear airbag assembly 44*b* is substantially identical to the airbag assembly 44*a*. The rear airbag assembly 44*b* and the airbag assembly 44*a* may include common features, e.g., a housing 48, a plate 50, an inflator 52, etc. Common features among the rear airbag assembly 44*b* and the airbag assembly 44*a* shown in the figures are identified with common numerals.

The rear airbag assembly 44*b* may include a rear airbag 46*b* inflatable from the uninflated position to the inflated position. The rear airbag 46*b* is substantially identical to the airbag 46*a*. For example, the airbag 46*a* and the rear airbag 46*b* may be mirror images of each other about the lateral axis A2. That is, the rear airbag 46*b* may be disposed vehicle-forward of the rear cable 42, i.e., between the rear cable 42 and the battery tray 32.

Figure 6:
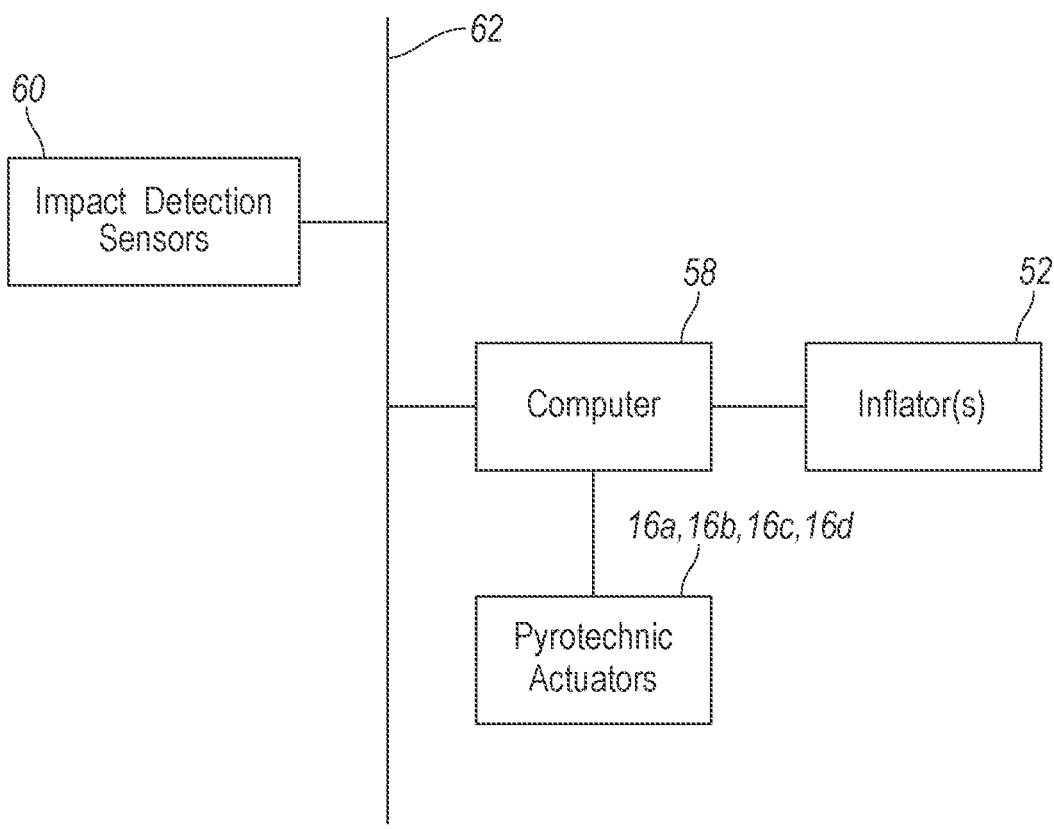
FIG. 6 is block diagram of a control system for the electric vehicle.

With reference to FIG. 6, the restraint system 66 may include a control system 56. The control system 56 may include a computer 58, an impact detection sensor 60, the airbag assembly 44*a*, e.g., the inflator 52, and the rear airbag assembly 44*b*, e.g., the inflator 52, in communication through a communication network 62.

The impact detection sensor 60 may be in communication with the computer 58. The impact detection sensor 60 is programmed to detect an impact to the electric vehicle 10. The impact detection sensor 60 may be of any suitable type, for example, post-contact sensors such as accelerometers, pressure sensors, and contact switches; and pre-impact detection sensors such as radar, lidar, and vision-sensing systems. The vision systems may include one or more cameras, CCD image sensors, CMOS image sensors, etc. The impact detection sensor 60 may be located at numerous points in or on the electric vehicle 10.

The computer 58 may be a microprocessor-based computing device implemented via circuits, chips, or other electronic components. The computer 58 may include a processor, memory, etc. The memory of the computer 58 may store instructions executable by the processor and the processor may read the instructions from the memory and execute the instructions. The computer 58 may be, for example, a restraint control module (RCM).

The control system 56 may transmit signals through the communications network 62 such as a controller area network (CAN) bus, Ethernet, Local Interconnect Network (LIN), and/or by any other wired or wireless communications network.

The computer 58 may be programmed to actuate the first and second pyrotechnic actuators 16a, 16b in response to detecting a vehicle impact. For example, in response to receiving the signals from the impact detection sensor 60, the computer 58 may initiate the ignition of the first and second pyrotechnic actuators 16a, 16b. In other words, in examples in which the impact detection sensor 60 detect a vehicle impact, the computer 58 may send a signal to ignite the first and second pyrotechnic actuators 16a, 16b. In this situation, the first and second pyrotechnic actuators 16a, 16b discharge, which moves the first and second sliders 14a, 14b, respectively, in the vehicle-forward direction along the longitudinal axis A1 to the deployed position, as set forth above. The computer 58 may actuate the first and second pyrotechnic actuators 16a, 16b simultaneously.

Alternatively, the computer 58 may be programmed to selectively actuate the first and second pyrotechnic actuators 16a, 16b based on information from the impact detection sensor 60 identifying the physical characteristics of the vehicle impact, e.g., which side of the electric vehicle 10 impacted, amount of pressure applied to the electric vehicle 10, etc. For example, upon determining that the vehicle impact is a frontal impact, the computer 58 may be programmed to actuate the first and second pyrotechnic actuators 16a, 16b, as discussed immediately above. Upon determining that the vehicle impact is a rearward impact, the computer 58 can prevent actuation of the first and second pyrotechnic actuators 16a, 16b in response to a detection of the vehicle impact. In other words, in examples in which the impact detection sensor 60 detects a vehicle-rearward impact, the computer 58 may send a signal to prevent actuation of the first and second pyrotechnic actuators 16a, 16b. Alternatively, the computer 58 may not send a signal to the first and second pyrotechnic actuators 16a, 16b upon detecting the vehicle-rearward impact.

Additionally, the computer 58 may be programmed to control inflation of the airbag 46a in response to detecting the vehicle impact. For example, in response to receiving the signals from the impact detection sensor 60, the computer 58 may initiate the inflation of the airbag 46a. In other words, in examples in which the impact detection sensor 60 detects a vehicle impact, the computer 58 may send a signal to actuate the inflator 52. In this situation, the inflator 52 discharges inflation medium, which inflates the airbag 46a. The computer 58 may, for example, initiate actuation of the pyrotechnic actuators prior to initiating inflation of the airbag 46a. That is, the computer 58 may send a signal to initiate actuation of the first and second pyrotechnic actuators 16a, 16b prior to sending a signal to initiate inflation of the airbag 46a. As another example, the computer 58 may initiate actuation of the first and second pyrotechnic actuators 16a, 16b and inflation of the airbag 46a simultaneously.

Alternatively, the computer 58 may be programmed to selectively initiate the airbag 46a based on information from the impact detection sensor 60 identifying the physical characteristics of the vehicle impact, e.g., which side of the electric vehicle 10 impacted, amount of pressure applied to the electric vehicle 10, etc. For example, upon determining that the vehicle impact is a frontal impact, the computer 58 may be programmed to inflate the airbag 46a, as discussed immediately above. Upon determining that the vehicle impact is a rearward impact, the computer 58 can prevent inflation of the airbag 46a, e.g., in substantially the same manner as discussed above regarding preventing actuation of the first and second pyrotechnic actuators 16a, 16b.

In examples in which the electric vehicle 10 includes the rear airbag assembly 44b, the computer 58 may be programmed to actuate the third and fourth pyrotechnic actuators 16c, 16d in response to detecting a vehicle impact, e.g., in substantially the same manner as discussed above regarding the actuation of the first and second pyrotechnic actuators 16a, 16b. In an example in which the computer 58 is programmed to selectively actuate the third and fourth pyrotechnic actuators 16c, 16d, the computer 58 may be programmed to actuate the third and fourth pyrotechnic actuators 16c, 16d in response to detecting a vehicle-rearward impact, and to prevent actuation of the third and fourth pyrotechnic actuators 16c, 16d in response to detecting the vehicle-forward impact, e.g., in substantially the same manner as discussed above regarding selectively actuating the first and second pyrotechnic actuators 16a, 16b.

Additionally, in such an example, the computer 58 may be programmed to control inflation of the rear airbag 46b in response to detecting the vehicle impact, e.g., in substantially the same manner as discussed above regarding inflation of the airbag 46a. In an example in which the computer 58 is programmed to selectively actuate the third and fourth pyrotechnic actuators 16c, 16d, the computer 58 may be programmed to inflate the rear airbag 46b in response to detecting a vehicle-rearward impact, and to prevent inflation of the rear airbag 46b in response to detecting the vehicle-forward impact, e.g., in substantially the same manner as discussed above regarding selectively inflating the airbag 46a.

Computing devices, such as the computer 58, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

During a vehicle impact, an object impacts the electric vehicle 10, and causes vehicle components to move rearward along the longitudinal axis A1, i.e., towards the electric-vehicle battery 20. Since the cable 18 is under tension prior to the impact, the cable 18 distributes a force from the impact to the rockers 12. Specifically, the cable 18 remains attached to the sliders 14 during the vehicle impact. The tension of the cable 18 results in the cable 18 opposing movement of the vehicle components toward the electric-vehicle battery 20 to reduce the likelihood that the vehicle components impact the electric-vehicle battery 20.

The disclosure has been described in an illustrative manner, and it is to be understood that the terminology which has been used is intended to be in the nature of words of description rather than of limitation. Numerical adjectives, e.g., "first," "second," "third," and "fourth," are used herein merely as identifiers and are not intended to indicate order or importance. Many modifications and variations of the present disclosure are possible in light of the above teachings, and the disclosure may be practiced otherwise than as specifically described.

The invention claimed is:

1. An electric vehicle comprising:
a first rocker and a second rocker spaced from each other;
a first slider slideably engaged with the first rocker;
a second slider slideably engaged with the second rocker;
a first pyrotechnic actuator supported by the first rocker and configured to slide the first slider relative to the first rocker;
a second pyrotechnic actuator supported by the second rocker and configured to slide the second slider relative to the second rocker; and
a cable extending from the first slider to the second slider.

2. The electric vehicle of claim 1, wherein the cable is fixed to the first and second sliders, the cable being under tension between the first and second sliders.

3. The electric vehicle of claim 1, further comprising an airbag supported by the cable and being inflatable to an inflated position.

4. The electric vehicle of claim 3, further comprising a plate connected to the cable, the airbag being fixed to the plate.

5. The electric vehicle of claim 3, wherein the airbag is disposed between the cable and the first and second rockers.

6. The electric vehicle of claim 3, further comprising a cover supported by the cable and including a tear seam adjacent to the airbag, wherein the cover encloses the airbag in an uninflated position, and the airbag extends through the tear seam in the inflated position.

7. The electric vehicle of claim 1, further comprising an electric-vehicle battery supported by the first and second rockers and disposed between the first and second rockers.

8. The electric vehicle of claim 7, further comprising an airbag inflatable to an inflated position between the cable and the electric-vehicle battery.

9. The electric vehicle of claim 1, wherein the cable is disposed vehicle-forward of the first and second rockers.

10. The electric vehicle of claim 1, wherein the first and second sliders are slidable in a vehicle-forward direction to a deployed position.

11. The electric vehicle of claim 10, wherein the cable is spaced farther from the first and second rockers when the first and second sliders are in the deployed position than when the first and second sliders are in an undeployed position.

12. The electric vehicle of claim 1, further comprising a computer including a processor and a memory storing instructions executable by the processor to control actuation of the first and second pyrotechnic actuators in response to a vehicle impact.

13. The electric vehicle of claim 12, further comprising an airbag supported by the cable, wherein the instructions further include instructions to control inflation of the airbag in response to the vehicle impact.

14. The electric vehicle of claim 1, wherein the first and second rockers each include a front end generally aligned with each other, the first slider being disposed at the front end of the first rocker, and the second slider being disposed at the front end of the second rocker.

15. The electric vehicle of claim 1, further comprising:
a third slider slidably engaged with the first rocker and spaced from the first slider;
a fourth slider slideably engaged with the second rocker and spaced from the second slider;
a third pyrotechnic actuator supported by the first rocker and configured to slide the third slider relative to the first rocker;
a fourth pyrotechnic actuator supported by the second rocker and configured to slide the fourth slider relative to the second rocker; and
a rear cable extending from the third slider to the fourth slider, the rear cable being fixed to the third and fourth sliders and being under tension.

16. The electric vehicle of claim 15, further comprising an airbag supported by the cable and a rear airbag supported by the rear cable, wherein the airbag is disposed between the cable and the first and second rockers, and the rear airbag is disposed between the rear cable and the first and second rockers.

17. The electric vehicle of claim 16, further comprising a computer including a processor and a memory storing instructions executable by the processor to control inflation of the airbag and the rear airbag in response to a vehicle impact.

18. The electric vehicle of claim 15, wherein the first and second sliders are slidable in a vehicle-forward direction, and the third and fourth sliders are slidable in a vehicle-rearward direction.

19. The electric vehicle of claim 15, wherein the cable is disposed vehicle-forward of the first and second rockers, and the rear cable is disposed vehicle-rearward of the first and second rockers.

20. The electric vehicle of claim 15, wherein the first and second rockers each include a front end and a rear end spaced from the front end, the first and second sliders being disposed at the front end of the respective rocker, and the third and fourth sliders being disposed at the rear end of the respective rocker.

* * * * *